M. E. MALLOY.
SHOCK ABSORBER.
APPLICATION FILED FEB. 18, 1914.
1,135,909.
Patented Apr. 13, 1915.
2 SHEETS—SHEET 1.
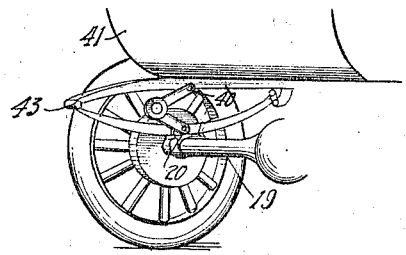
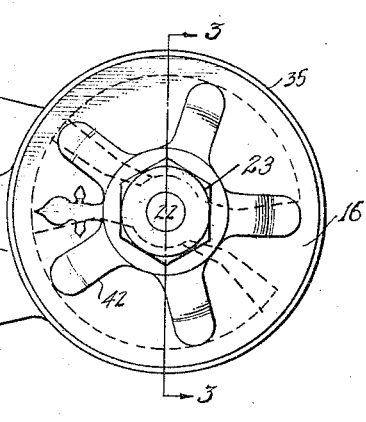
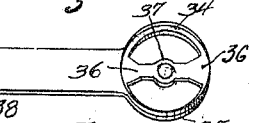
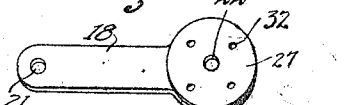
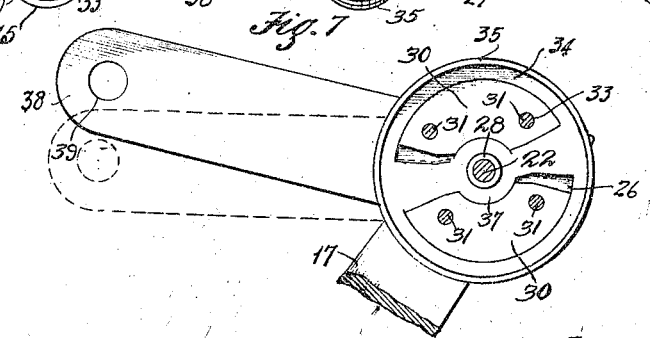
Witnesses:
James M. Abbett
Marguerite Bates
Inventor
Michael E. Molloy
By
Attys.

M. E. MALLOY.
SHOCK ABSORBER.
APPLICATION FILED FEB. 18, 1914.
1,135,909.
Patented Apr. 13, 1915.
2 SHEETS—SHEET 2.
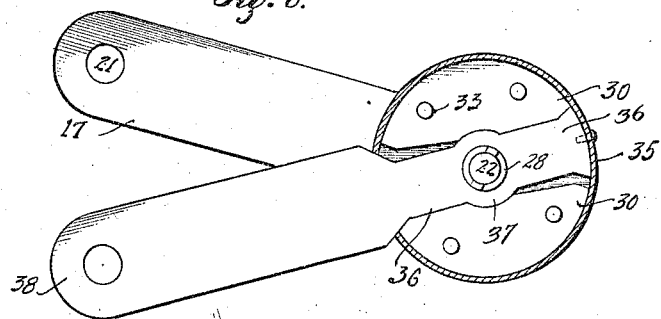
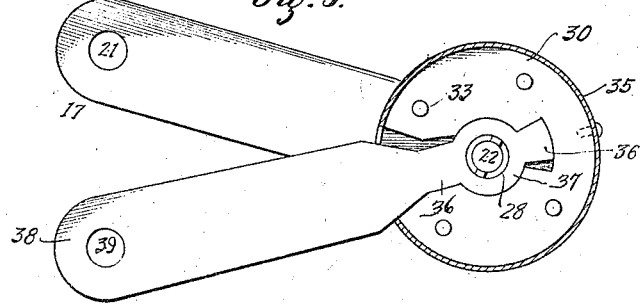
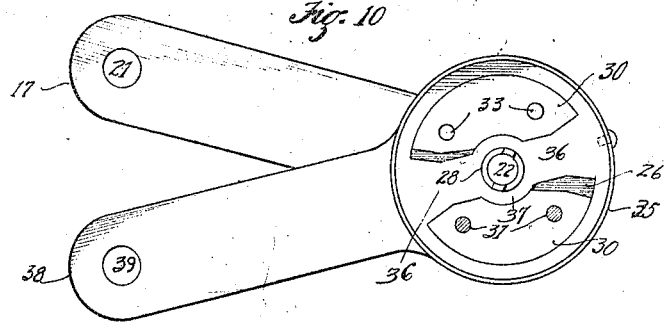
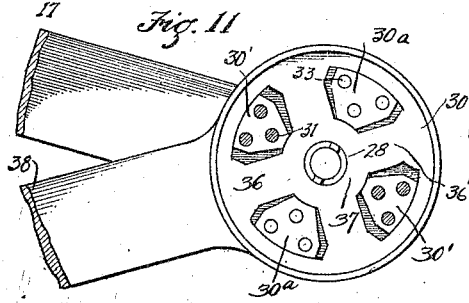
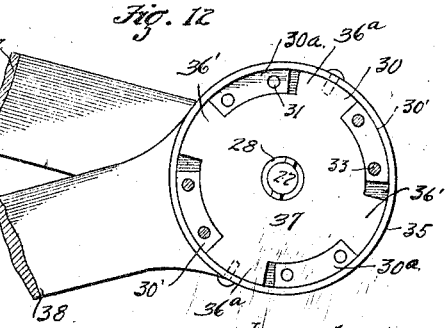
Witnesses:
James M. Attell
Marguerite Bates
By
Inventor:
Michael E. Malloy.
Hazard & Strauss
Attys

UNITED STATES PATENT OFFICE.

MICHAEL E. MALLOY, OF PASADENA, CALIFORNIA.

SHOCK-ABSORBER.

1,135,909.  Specification of Letters Patent.  Patented Apr. 13, 1915.

Application filed February 18, 1914. Serial No. 819,400.

*To all whom it may concern:*

Be it known that I, MICHAEL E. MALLOY, a citizen of the United States, residing at Pasadena, in the county of Los Angeles, State of California, have invented new and useful Improvements in Shock-Absorbers, of which the following is a specification.

This invention relates to a shock absorber, and particularly pertains to shock absorbers for use on vehicles for absorbing shocks at the maximum normal compression and expansion of the vehicle springs.

It is the object of this invention to provide a shock absorber which will permit of a free and unrestricted operation of the springs within their normal sphere of action and which will operate on excessive compression or expansion of the springs to retard their further movement and prevent shocks.

A further object is to provide a shock absorber which will automatically adjust itself to accommodate various loads in the vehicle to which it is attached, but which adjustment will permit of a limited free movement of the spring under various loads without effective operation of the shock absorber.

A further object is to provide a shock absorber of the friction type which is so constructed that the friction element operating means will have a zone of free movement without operating the friction elements.

A further object is to provide a shock absorber of the friction type having a limited inoperative zone wherein the zone is automatically shifted according to variations in the loads imposed on the shock absorber.

A further object is to provide a shock absorber of the friction type having a series of coöperating friction members, and to provide means for connecting the friction members to said bodies, whereby a lost motion will be effected to permit a limited movement of the bodies in relation to each other without restraint by the friction members.

The invention primarily resides in a shock absorber having a plurality of coöperating friction disks, and means for connecting the disks to relatively movable bodies, whereby said bodies may have free movement in relation to each other without operating and being unrestricted by the action of the friction disks.

The invention is illustrated in the accompanying drawings, in which:

Figure 1 is a perspective view showing the shock absorber as applied between the axle and body of a vehicle. Fig. 2 is a view of the shock absorber in side elevation. Fig. 3 is a vertical section on the line 3—3 of Fig. 2, as seen in the direction indicated by the arrows. Fig. 4 is a view in perspective of one of the outer arms of the shock absorber, illustrating the inner face thereof and showing the spaced segmental plates as positioned thereon. Fig. 5 is a detail perspective view of the intermediate arm of the shock absorber. Fig. 6 is a perspective view of the other outer arm of the shock absorber as seen on its inner face and showing the friction disk positioned thereon. Fig. 7 is a view in vertical section on the line 7—7 of Fig. 3 as seen in the direction indicated by the arrows, showing the parts illustrated in Figs. 4 and 5 in their assembled position, and with the parts shown in Fig. 6 as removed. Figs. 8, 9, 10, 11 and 12 are views similar to Fig. 7 showing modifications of the invention.

In the general application of shock absorbers to vehicles for the purpose of preventing shocks due to excessive movement of the vehicle body and axles in relation to each other, the shock absorbers coöperate with the vehicle springs at all times, thus rendering them objectionable in that when the vehicle is lightly loaded the resistance offered by the shock absorber to the initial compression of the vehicle springs acts to negative the operation of the latter and thereby decreases or prevents the necessary resilient movement of the vehicle body and axles in relation to each other.

Shock absorbers of this character are further objectionable in that when the vehicle is subjected to excessive jolts, as in passing over obstructions or uneven roadways, the shock absorbers will usually operate too slowly to effect the desired cushioning action or suddenly oppose the spring action, which renders them ineffective for the use for which they are intended.

This invention overcomes the above objectionable features of the ordinary shock absorbers in providing a zone of free movement, whereby the springs of the vehicle will be permitted to perform their usual functions without obstruction, whether the vehicle be running light, or heavily loaded.

In carrying out the invention I employ a structure substantially as shown in the accompanying drawings, in which 15 and 16 indicate opposite circular face plates of the shock absorber formed with corresponding extensions or arms 17 and 18, respectively, as particularly shown in Figs. 4 and 6. The arms 17 and 18 extend parallel with each other and are detachably connected together at their outer ends and secured to the axle 19 of a vehicle by means of a bolt 20 which passes through perforations 21 in the outer ends of the arms 17 and 18 and engage a lug on the axle 19.

The face plate 15 is formed with a stud 22 which passes through a perforation 22' in the face plate 16 and is threaded at its outer end to receive a nut 23 by which the face plates 15 and 16 and a series of friction members interposed therebetween are secured together. Arranged adjacent the inner faces of the face plates 15 and 16 are flanged circular brass plates 24 and 25 against the inner faces of which fiber friction disks 26 and 27 are disposed; the plates 24 and 25 and friction disks 26 and 27 being perforated centrally to extend around a spacing ring 28 on the stud 22.

Interposed between the fiber disks 26 and 27 are a pair of corresponding segmental metallic plates 30, the ends of which extend approximately in radial relation to the center of the stud 22; the adjacent ends of the segmental plates being spaced apart. The segmental plates 30 are held against movement in relation to the fiber disks by means of pins 31, which extend through perforations 32 in the fiber disks 26 and 27 and pass through perforations 33 in the segmental plates 30; the outer arcuate edges of the segmental plates 30 are spaced a short distance within the peripheral edges of the fiber disks concentric therewith and their inner arcuate edges are spaced from the sleeve 28. Interposed between the fiber disks and encompassing the outer arcuate edges of the segmental plates in slidable contact therewith is a metallic ring 34 of a thickness corresponding to the thickness of the segmental plates, which ring is affixed within a second ring 35 which extends on opposite sides thereof and slidably encircles the peripheral edges of the flanged plates 24 and 25. The ring 35 thus forms annular flanges extending on the opposite sides of the ring 34, and if desired, may be formed integral with the latter. Radially extending webs 36 are formed on the inner marginal edge of the ring 34 and connect with the outer peripheral edge of a ring 37 surrounding the sleeve 28; the webs 36 lying in the spaces between the ends of the segmental plates and being of a width less than the width of said spaces whereby a short rotary movement of the ring 34 can be effected without causing rotation of the fiber friction disks 26 and 27.

The ring 34 has an arm member 38 formed thereon corresponding to the members 17 and 18 on the face plates 15 and 16; the arm 38 being perforated at its outer end at 39 to receive a bolt 40 by which it can be secured to the vehicle body 41.

In the application of the invention, the friction members including the face plates 15 and 16, the flanged brass plates 24 and 25, the fiber disks 26 and 27 and the ring 34 are clamped together on the stud 22 by means of the nut 23 which bears against a resilient washer 42 in the manner common in shock absorbers of this type; the frictional engagement between the various friction members being adjusted according to the pressure exerted thereon by the clamping action of the nut 23.

In the operation of the invention, the members 17 and 18 are connected to the axle of the vehicle and the member 38 is connected to the body, or vice versa, or may be attached to any bodies having relative movement in relation to each other on springs 43, here shown as the ordinary elliptical springs. The shock absorber is so adjusted and set in relation to the moving bodies that the arm member 38 will have a zone of movement in relation to the members 17 and 18 within the range of the normal movement of the movable bodies as supported by the spring 43 without operation of the friction disks. For instance, with the parts positioned as particularly shown in full lines in Fig. 7, the member 17 will be free to move in relation to the member 38 from the position shown in full lines to the position indicated in dotted lines without effecting the operation of the shock absorber by reason of the lost motion provided between the webs 36 and the ends of the segmental plates 30. This movement of the members 17 corresponds with the normal range of movement of the springs 43.

In event the movement of the members 17 is increased beyond their normal range of movement in either direction the webs 36 will engage the ends of the segmental plates 30 and thereby rotate the friction disks 26 and 27 in opposition to the frictional engagement thereof and their coöperating friction members; the return movement of the member 17 being unrestricted for a short distance by reason of the lost motion between the webs 36 and the segmental plates 30 and retarded on the latter part of the stroke in event this stroke is greater than the range of movement permitted by the lost motion, by the action of the friction members.

In the modified form of the invention as shown in Fig. 8, the ring 34 is dispensed with and the segmental plates 30 have their outer margins extended to lie adjacent to the inner periphery of the ring 35, which ring is affixed to the webs 36.

In the modified form shown in Fig. 9 the segmental plates 30 are joined at their outer periphery and the web 36 projects into a slot from one side of the ring 37. In this construction the ring 35 is attached to the segmental plates 30.

Throughout the forms of the invention previously described the engagement of the segmental plates 30 by the webs 36 causes the rotation of the two fiber friction disks 26 and 27 simultaneously through the pins 31, thus imposing the full restraining action of the shock absorber on its initial operation. If the frictional engagement of the various friction members is sufficient an objectionable shock might be occasioned by this operation. This, however, may be overcome by mounting one of the friction plates 30 on the fiber disk 26 and the other segmental plate 30 attached only to the fiber disk 27 so that the friction plates 30 may be moved independent of each other. When this arrangement is employed the friction disks 30 are so shaped that the space between the inner ends thereof will be less than the space between their outer ends as illustrated in Fig. 10. This may be accomplished by off-setting the segmental disks in relation to each other or by increasing the width of the web 36. By this construction, when the arm is rocked in either direction the web 36 will engage one of the plates 30 thereby actuating one of the friction disks on half of the device, thus utilizing but approximately one-half of the retarding power of the device. The continued movement of the arm will cause the other segmental plate 30 to be engaged to operate the friction members on the other half of the device so that the full retarding power of the absorber will be utilized. By this construction the shock absorber will have two degrees of retarding action. The same results are accomplished by the construction shown in Figs. 11 and 12, in which are shown two pairs of plates 30' and 30ᵃ interposed between webs 36' and 36ᵃ. The webs 30' are mounted on one of the fiber friction disks and the other plates 30ᵃ which are of greater width than the plates 30' are mounted on the other fiber friction disk in such manner that the plates 30ᵃ will be engaged previous to the engagement of the plates 30' so as to obtain two degrees of action of the device.

What I claim is:

1. A shock absorber, comprising a pair of spaced disks, a pivot pin connecting said disks, a ring on said pivot pin intermediate the disk, radial webs on the diametrically opposite sides of said ring, an arm connecting with said webs, arms on said disks adapted to be connected together at their outer ends, a pair of spaced friction disks on the opposite sides of the ring, and members interposed between and connected to said friction disks on opposite sides of the ring spaced from the sides of the webs, whereby the arm connecting with the webs may have a limited movement relative to the arms on the disks without operating the friction disks.

2. A shock absorber, comprising a pair of spaced disks, connected arms on said disks, a pivot pin extending between said disks axially thereof, a ring on said pivot pin intermediate said disks, a pair of connected friction disks on the opposite sides of said ring, webs extending from the diametrically opposite sides of said ring between the friction disks, and plates attached to said friction disks intermediate thereof on the opposite sides of the ring arranged with their ends spaced from the sides of the webs, whereby said ring and webs may have a limited movement without engaging said plates.

3. A shock absorber, comprising a pair of spaced disks, connected arms attached to said disks, a pivot pin extending axially through said disks, a ring loosely mounted on said pivot pin intermediate said disks, webs on said ring extending on the diametrically opposite sides thereof, an arm connected to said webs, a pair of friction disks extending on opposite sides of the ring, complementary friction disks interposed between said friction disks and the arm carrying disk, and plates interposed between and connected to the first-named friction disks arranged on the diametrically opposite sides of the ring with their ends spaced from the webs, whereby a limited movement of the webs and rings may be had without effecting an engagement therebetween.

4. A shock absorber comprising, a pair of spaced disks, a pivot pin connecting said disks, a ring on said pivot pin intermediate the disks, a web on said ring, an arm connecting with said web, arms on said disks, a pair of friction disks arranged on opposite sides of the ring, and members interposed between and connected to said friction disks and spaced from the sides of the web, whereby the arm connecting with the web may have a limited movement relative to the arms on the disks without operating the friction disks.

In witness that I claim the foregoing I have hereunto subscribed my name this 6th day of February, 1914.

M. E. MALLOY.

Witnesses:
  Edmund A. Strause,
  Marie Battey.